United States Patent
Shen et al.

(10) Patent No.: US 11,525,318 B2
(45) Date of Patent: Dec. 13, 2022

(54) MOTOR BYPASS VALVE

(71) Applicant: Schlumberger Technology Corporation, Sugar Land, TX (US)

(72) Inventors: Yuelin Shen, Spring, TX (US); Zhengxin Zhang, Spring, TX (US); Wei Chen, Katy, TX (US); Zhenyu Chen, Beijing (CN); Maria Neves Carrasquilla, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/128,382

(22) Filed: Dec. 21, 2020

(65) Prior Publication Data

US 2021/0189815 A1  Jun. 24, 2021

Related U.S. Application Data

(60) Provisional application No. 62/953,236, filed on Dec. 24, 2019.

(51) Int. Cl.
 *E21B 21/10* (2006.01)
 *E21B 34/06* (2006.01)
 *F16J 15/48* (2006.01)

(52) U.S. Cl.
 CPC ............ *E21B 21/103* (2013.01); *E21B 34/06* (2013.01); *F16J 15/48* (2013.01)

(58) Field of Classification Search
 CPC .......... E21B 21/103; E21B 34/06; F16J 15/48
 See application file for complete search history.

(56) References Cited

U.S. PATENT DOCUMENTS

| | | | | |
|---|---|---|---|---|
| 4,019,592 A | * | 4/1977 | Fox .......................... | E21B 17/07 166/334.4 |
| 4,298,077 A | * | 11/1981 | Emery ...................... | E21B 4/02 175/243 |
| 6,540,020 B1 | * | 4/2003 | Falgout, Sr. .............. | E21B 4/02 166/250.01 |
| 9,328,579 B2 | * | 5/2016 | Wilson ................... | E21B 23/006 |
| 10,590,709 B2 | * | 3/2020 | Sicilian ..................... | E21B 6/04 |
| 2015/0292280 A1 | * | 10/2015 | Lewis ................... | E21B 21/103 175/25 |
| 2016/0024884 A1 | * | 1/2016 | Baudoin ............... | E21B 21/103 166/334.4 |
| 2017/0342788 A1 | * | 11/2017 | Wesson ................. | E21B 21/103 |
| 2018/0230750 A1 | * | 8/2018 | Lorenson .............. | E21B 21/103 |
| 2020/0157897 A1 | * | 5/2020 | Hered ................... | E21B 21/103 |

FOREIGN PATENT DOCUMENTS

CN  106437578 A  *  2/2017
WO  2018222530 A1  12/2018

* cited by examiner

*Primary Examiner* — Matthew R Buck

(57) ABSTRACT

A motor bypass valve diverts drilling fluid away from a downhole motor when the motor is off bit. Bypassing the downhole motor reduces the shock and vibration on the BHA caused by the downhole motor, thereby reducing the damage to the BHA. The motor bypass valve may divert fluid out of a housing or into a bore through the rotor of the downhole motor.

18 Claims, 10 Drawing Sheets

MOTOR BYPASS VALVE

CROSS-REFERENCE TO RELATED APPLICATIONS

This application claims the benefit of, and priority to, U.S. Patent Application No. 62/953,236 entitled "Motor Bypass Valve," filed on Dec. 24, 2019, which is incorporated herein by this reference in its entirety.

BACKGROUND

Downhole drilling operations may include many tools, often assembled downhole in a bottomhole assembly (BHA). The BHA may include a downhole motor, which may provide electricity and/or rotary power for elements of the BHA. The BHA may further include a bit, which may degrade the formation. During drilling, the bit may degrade the formation at the bottom of the wellbore. When the bit is at the bottom of the wellbore, the bit is considered "on bottom." In some embodiments, the bit may be lifted up from the bottom of the wellbore ("off bottom"). The bit may be taken off bottom for any reason. For example, the bit may be taken off bottom to check for a kick, to resolve issues with drilling, or for any reason.

SUMMARY

In some embodiments, a motor bypass valve includes a rotor for a downhole motor. The rotor includes a rotor bore having an inlet and an outlet. A nozzle is longitudinally movable relative to the rotor. The nozzle includes a nozzle bore. The nozzle has at least two positions: a first position and a second position. In the first position, a first hydraulic pathway is open between the nozzle bore and the rotor bore. In the second position, a second hydraulic pathway is open between a nozzle annulus and the rotor bore.

In some embodiments, a housing includes a housing port extending from an interior of the housing to an exterior of the housing. A stationary sleeve in the interior of the housing includes a sleeve port extending from an interior of the stationary sleeve to an exterior of the stationary sleeve. A moving sleeve is movable between a first position and a second position. In the first position, the moving sleeve covers the sleeve port. In the second position, the sleeve port is uncovered and a hydraulic pathway is open between the sleeve port and the housing port.

In some embodiments, a motor bypass valve includes a housing having a housing port from an interior of the housing to an exterior of the housing. An inner sleeve includes a sleeve port from an interior of the inner sleeve to an exterior of the inner sleeve. The housing is longitudinally movable between a first position and a second position. In the first position the housing covers the sleeve port and in the second position the sleeve port is open and a hydraulic pathway is open between the sleeve port and the housing port.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIGS. 2-1 and 2-2 are representations of a cross-sectional view of a motor bypass valve in the open and closed positions, according to embodiments of the present disclosure;

FIG. 2-3 is a representation of a cross-sectional view of the motor bypass valve of FIG. 2-1, according to embodiments of the present disclosure;

FIGS. 3-1 and 3-2 are representations of a cross-sectional view of a motor bypass valve, according to embodiments of the present disclosure;

FIGS. 4-1 and 4-2 are representations of a cross-sectional view of a motor bypass valve, according to embodiments of the present disclosure; and FIGS. 5-1 and 5-2 are representations of a cross-sectional view of a motor bypass valve, according to embodiments of the present disclosure.

DETAILED DESCRIPTION

This application generally relates to devices, systems, and method for diverting flow from a downhole motor when a bit is off bottom. In some embodiments, the motion of the downhole motor and/or the rotation of the drill string from the surface may cause shock and vibrations to the rest of the BHA. When the bit is at the bottom of the wellbore ("on bottom"), the bit, and the rest of the BHA, may be stabilized. Therefore, the shock and vibrations caused by the motor may be reduced when the bit is on bottom. When the bit is off the bottom of the wellbore ("off bottom") and the string is being rotated and/or fluids are being pumped downhole, the shock and vibration on the BHA may be increased. This may damage components of the BHA, and, in some instances, even twist off one or more components of the BHA (e.g., cause the rotational connection between components of the BHA to become disconnected). Bypassing at least a portion of the drilling fluid from the downhole motor may stop or reduce rotation of the downhole motor. Bypassing at least a portion of the drilling fluid from the downhole motor while the bit is off bottom may reduce the shock and vibration to the BHA caused by the downhole motor (e.g., a portion of the BHA below the downhole motor), which may reduce damage to the BHA, thereby decreasing costs associated with repairing equipment and lost drilling time.

Figure 1:
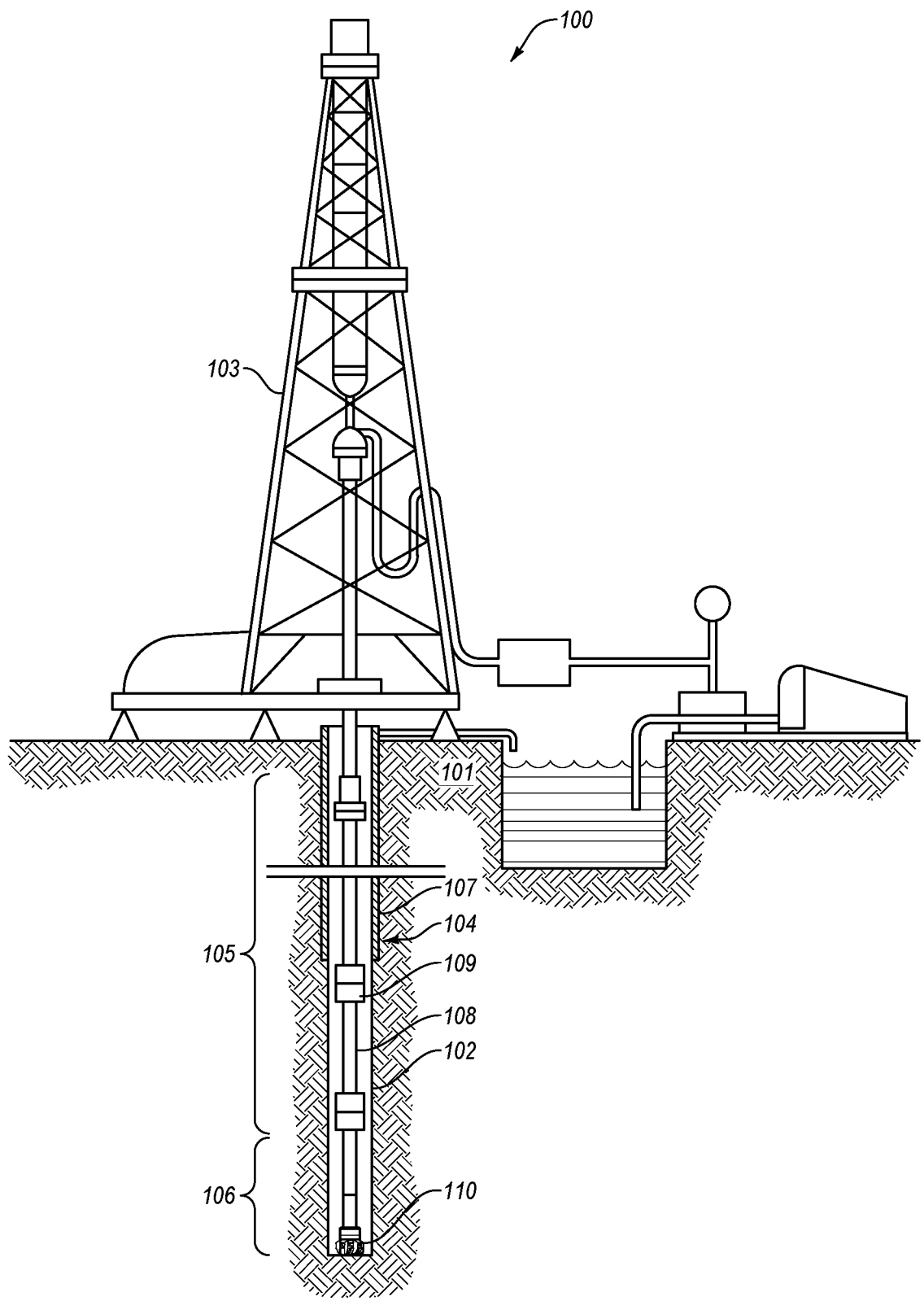
FIG. 1 is a representation of a drilling system, according to embodiments of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly (BHA) 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling (MWD) tools, logging-while-drilling (LWD) tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore. Using measurements obtained with the RSS, the RSS may locate the bit 110, change the course of the bit 110, and direct the directional drilling tools on a projected trajectory.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

In some embodiments, a downhole motor in the BHA 106 may generate power for downhole systems and/or provide rotational energy for downhole components (e.g., rotate the bit 110). The downhole motor may be any type of downhole motor, including a positive displacement pump (such as a progressive cavity motor) or a turbine. In some embodiments, the downhole motor may be powered by the drilling fluid. In other words, the drilling fluid pumped downhole from the surface may provide the energy to rotate a rotor in the downhole motor.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface or may be allowed to fall downhole.

Figures 1, 2:
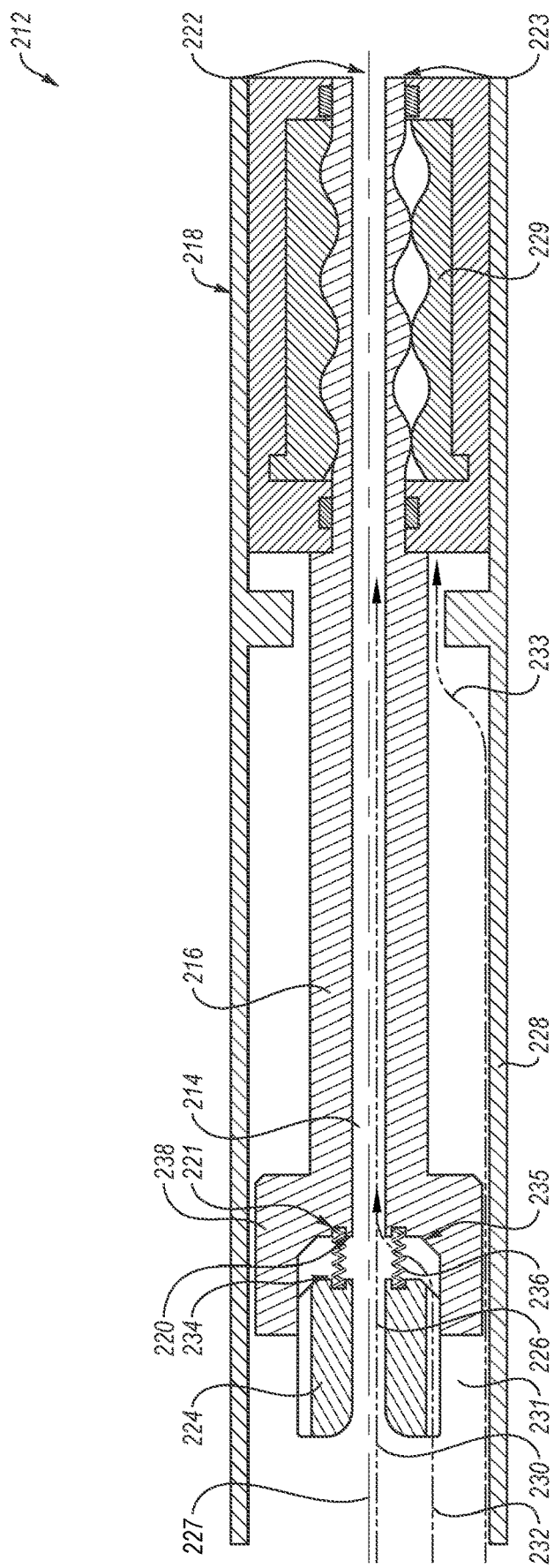
Figure 2:
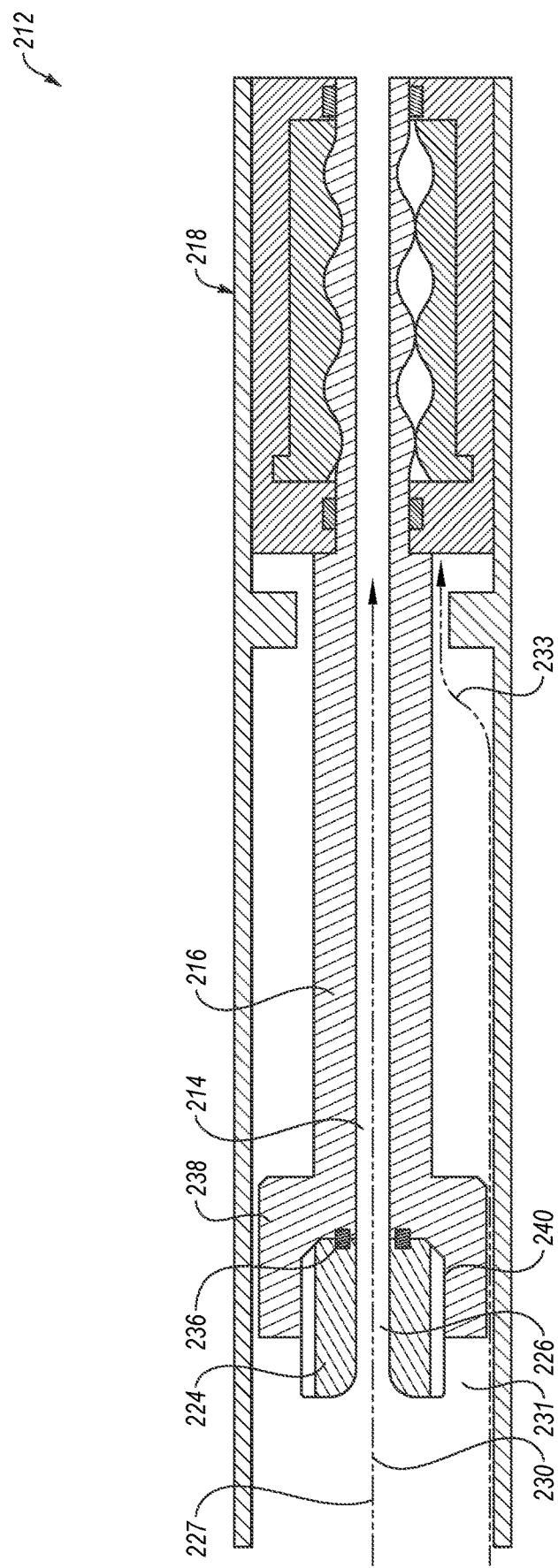

FIG. 2-1 is a representation of a motor bypass valve 212, according to embodiments of the present disclosure. In the embodiment shown, the motor bypass valve 212 directs drilling fluid through a rotor bore 214 in a rotor 216 of a downhole motor 218. The rotor bore 214 has an inlet 220 at an uphole end 221 of the rotor 216 and an outlet 222 at a downhole end 223 of the rotor 216. The nozzle 224 is located at the inlet 220. The nozzle 224 may be longitudinally movable relative to the rotor 216. The nozzle 224 includes a nozzle bore 226. In some embodiments, the nozzle bore 226 and the rotor bore 214 may be coaxial. In some embodiments, the inlet 220 of the rotor bore 214 may be located above (e.g., uphole) the stator 229 of the downhole motor 218. The outlet 222 of the rotor bore 214 may be located below the stator 229 of the downhole motor 218. Thus, drilling fluid that passes through the rotor bore 214 may bypass the downhole motor 218. Drilling fluid that bypasses the downhole motor 218 may not impart any energy to rotating the downhole motor 218.

The motor bypass valve 212 includes a nozzle annulus 231 between the outer surface of the nozzle 224 and the interior of surface of the motor housing. A motor hydraulic pathway 233 may direct fluid through the nozzle annulus 231 and into the downhole motor 218. This fluid may engage the rotor 216 and cause it to rotate relative to the stator 229.

In the embodiment shown in FIG. 2-1, the motor bypass valve 212 is in the open position. In the open position, a first hydraulic pathway 230 is open from the nozzle bore 226 to the rotor bore 214. Furthermore, in the open position shown, a second hydraulic pathway 232 to the rotor bore 214 may be open. In some embodiments, the second hydraulic pathway 232 may be from the nozzle annulus 231 to the inlet 220 of the rotor bore 214. In other words, in the open position, drilling fluid from the nozzle annulus 231 may travel between the downhole end 234 of the nozzle 224 and the uphole end 235 of the rotor 216 and enter the rotor bore 214 at the inlet 220. In some embodiments, the diverted portion of the fluid may be diverted from the motor hydraulic pathway 233 to the second hydraulic pathway 232. In some embodiments, the diverted portion of drilling fluid that moves through the second hydraulic pathway 232 may reduce the remaining portion of fluid that flows past the nozzle 224 to the downhole motor 218. In some embodiments, the remaining portion of fluid traveling through the motor hydraulic pathway 233 may be reduced such that the remaining portion does not have sufficient energy to rotate the rotor 216, or rotates the rotor 216 with a reduced rotational rate. In this manner, in the open position, at least a portion of the drilling fluid may bypass the downhole motor 218. Reducing or stopping the rotational rate of the rotor 216 (e.g., bypassing the downhole motor 218) may lower the shock and vibrations experienced by the BHA, which may help to prevent damage to the BHA.

In some embodiments, the nozzle 224 may be movable by one or more resilient members 236. For example, the resilient member 236 may urge the nozzle 224 toward the open position of FIG. 2-1 with a resilient member force. A drilling fluid pressure from the drilling fluid may exert a fluid pressure force on the nozzle 224 toward the closed position of FIG. 2-2. As the drilling fluid pressure increases, then the fluid pressure force may increase. When the fluid pressure force is greater than the resilient member force, then the nozzle 224 may move toward the closed position. In some embodiments, the fluid pressure force may cause the nozzle 224 to move from the open position to the closed position. In other words, the nozzle 224 may move between the open position and the closed position based on the drilling fluid pressure. When the drilling fluid pressure reaches a valve actuating pressure, the nozzle 224 may be moved to the closed position shown in FIG. 2-2.

As discussed above, in some embodiments, the drilling fluid pressure may be higher when the bit is on bottom compared to when the bit is off bottom. Because the nozzle 224 is urged toward the open position when the drilling pressure is relatively low (e.g., below the valve actuating pressure), the nozzle 224 may be in the open position when the drilling pressure is relatively low. The nozzle 224 may then be moved to the closed position when the drilling fluid pressure is increased (e.g., to above the valve actuating pressure). Thus, because the drilling fluid pressure is increased when the bit is on bottom, when the bit is on bottom, the nozzle 224 may move into the closed position. Similarly, when the bit is moved off bottom, the drilling fluid pressure is decreased, and the nozzle 224 may move into the open position. In some embodiments, the size of the resilient member 236 may be selected based on the drilling fluid pressure. In other words, the resilient member 236 may be sized based on operating drilling fluid pressure to be used during drilling. At any pressure less than the operating drilling fluid pressure, the resilient member force may be greater than the fluid pressure force, and the resilient member 236 may urge the nozzle 224 into the open position.

In this manner, the motor bypass valve 212 may move between the open position (e.g., wherein drilling fluid may bypass the motor through the rotor bore) and the closed position (e.g., wherein drilling fluid may pass into and operate the downhole motor) based on whether the bit is on bottom or off bottom. Thus, when the bit is taken off bottom, the motor bypass valve 212 may open, and the shock and vibration due to motor operation may be reduced or eliminated. This may limit the damage to downhole tools due to shock and vibration while the bit is off bottom.

FIG. 2-2 is a representation of the motor bypass valve 212 of FIG. 2-1 in the closed position. In the closed position, the first hydraulic pathway 230 is open between the nozzle bore 226 and the rotor bore 214. The first hydraulic pathway 230 may be from the nozzle bore 226 bore to the rotor bore 214. In some embodiments, the first hydraulic pathway 230 may be the only hydraulic pathway to the rotor bore 214. In other words, in the closed position, drilling fluid may only enter the inlet 220 of the rotor bore 214 through the nozzle bore 226. In the closed position, fluid may flow through the nozzle annulus 231 and into the downhole motor 218 through the motor hydraulic pathway 233. Thus, in the closed position, the second hydraulic pathway 232 of FIG. 2-1 is at least partially closed.

In some embodiments, the first hydraulic pathway 230 may be open in both the closed position of FIG. 2-1 and the open position of FIG. 2-2. In some embodiments, the second hydraulic pathway 232 may be closed in the closed position of FIG. 2-2. In this manner, the motor bypass valve 212 is closed in the closed position, and the motor bypass valve 212 is open in the open position.

In the embodiment shown, the rotor 216 includes a nozzle cradle 238. The nozzle 224 may rest in the cradle 238. For example, the cradle 238 may include cradle walls 240 that extend uphole. The outer walls 242 of the nozzle 224 may rest inside the cradle walls 240. The nozzle 224 may slide along the cradle 238 as the nozzle 224 moves between the open position and the closed position. As may be seen in FIG. 2-3, a cross-sectional shape of the nozzle 224 may include one or longitudinal recesses 244. The longitudinal recesses 244 may form a gap between the cradle 238 and the nozzle 224. In the open position, this gap may be a portion of the second hydraulic pathway. In some embodiments, in the closed position, a downhole end of the nozzle 224 may contact, engage, or abut the uphole end of the rotor 216. This may form a seal between the nozzle 224 and the rotor 216 such that the longitudinal recesses are sealed against the uphole end of the rotor 216. In this manner, in the closed position, fluid may not enter the rotor bore 214. A resilient member (e.g., resilient member 236 of FIG. 2-1) may urge the nozzle uphole toward the open position. As the drilling fluid pressure exceeds the resilient member force, the nozzle 224 may move downhole toward the closed position. While the nozzle 224 is shown as moving longitudinally, the nozzle 224 may move in any other way relative to the rotor 216. For example, the nozzle 224 may rotate in response to a change in flow volume and/or drilling fluid pressure.

Figures 2, 3:
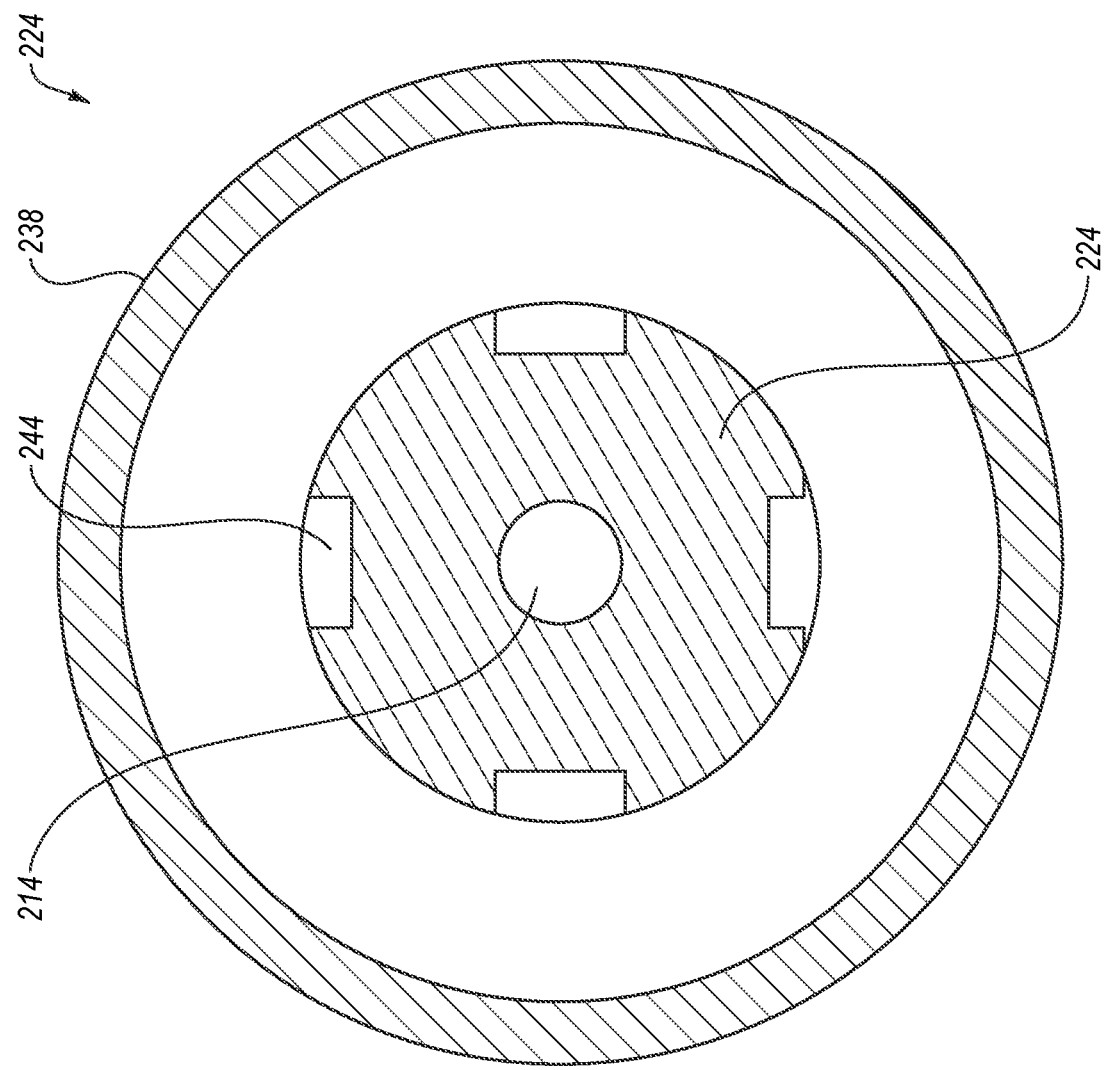
Figures 1, 3:
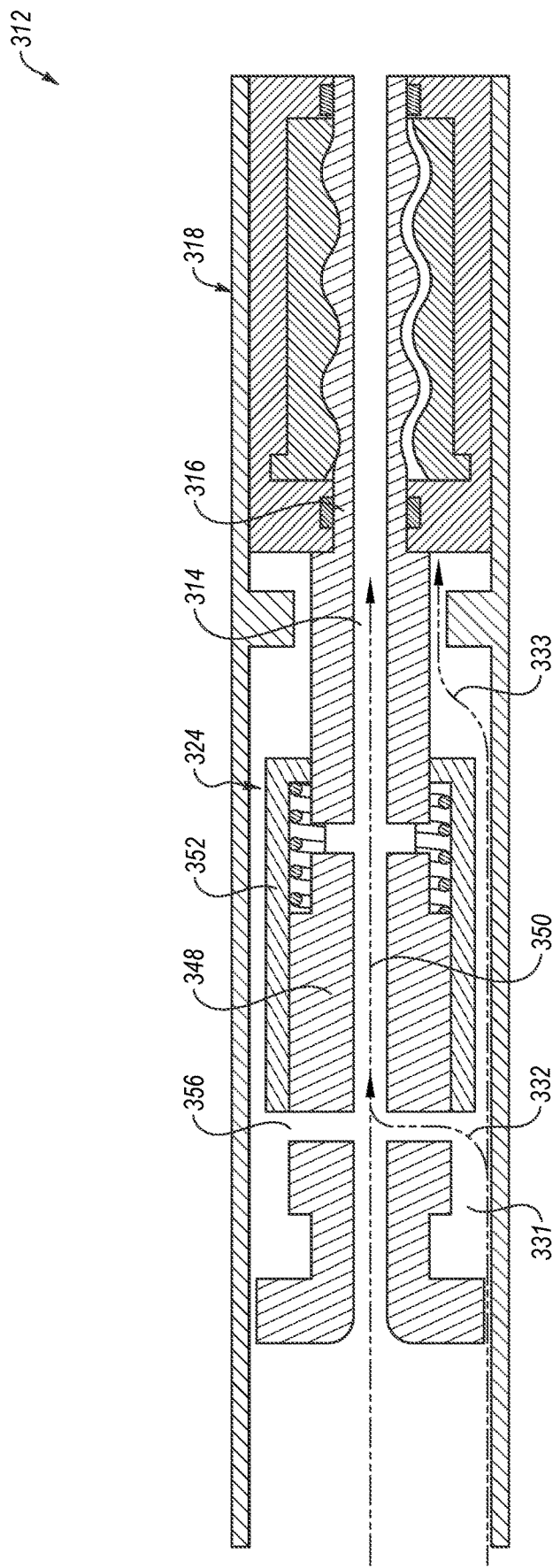
Figures 2, 3:
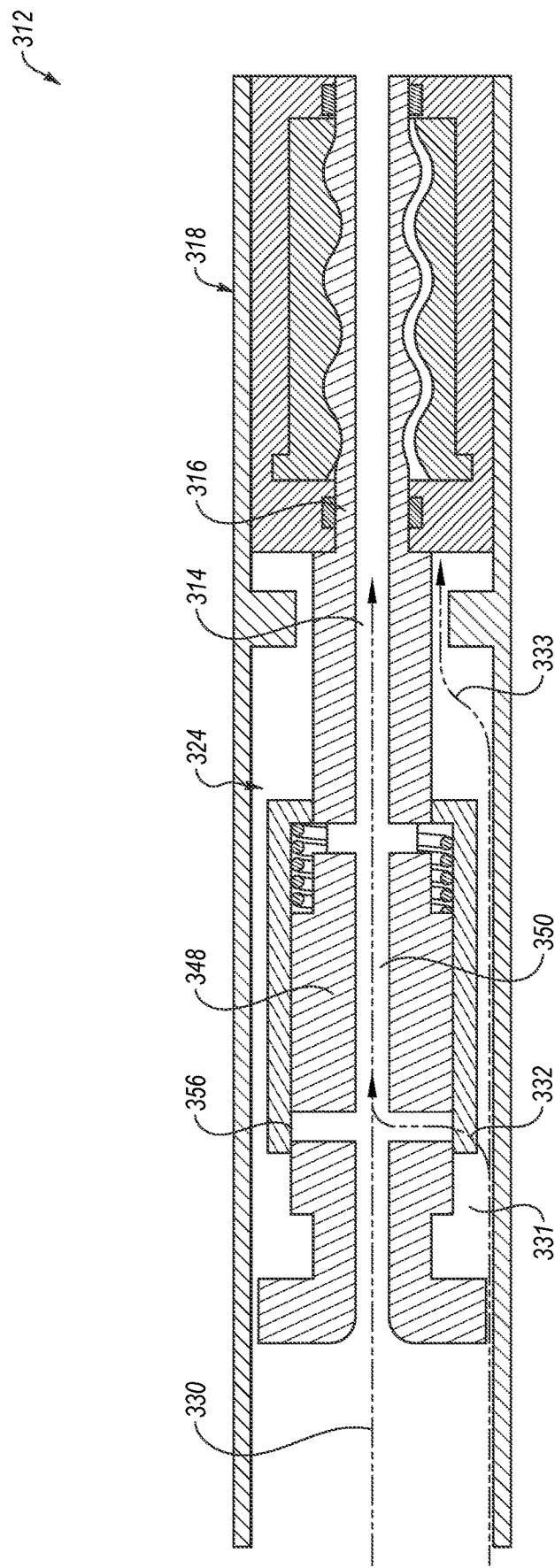

FIG. 3-1 is a representation of a motor bypass valve 312 in the open position, according to at least one embodiment of the present disclosure. In the embodiment shown, the motor bypass valve 312 includes a flow diverter 346 connected to a housing. A connecting shaft 348 may extend between the flow diverter 346 and a rotor 316 of a downhole motor 318. The connecting shaft 348 may include a shaft bore 350. The shaft bore 350 may be in hydraulic communication with a rotor bore 314 of the rotor 316. In other words, a first hydraulic pathway 330 may be open between the shaft bore 350 and the rotor bore 314. In some embodiments, a nozzle 324 may include a sleeve 352 that extends around the connecting shaft 348. The connecting shaft 348 may include one or more shaft ports 356 that extend from a nozzle annulus 331 to the shaft bore 350. In the open position shown in FIG. 3-1, the nozzle may be downhole of the shaft ports 356, and the shaft ports 356 may open a hydraulic pathway 332 (e.g., the second hydraulic pathway) between the nozzle annulus 331 and the shaft bore 350. In the open position, fluid may flow along a motor hydraulic pathway 333 and into the downhole motor 318, however, the fluid flow may be reduced such that the downhole motor 318 is not rotated or rotates with a reduced force (e.g., reduced compared to the closed position).

In the closed position shown in FIG. 3-2, the sleeve 352 of the nozzle 324 may at least partially cover the shaft ports 356. This may reduce or completely stop the flow of drilling fluid from the nozzle annulus 331 to the shaft bore 350. However, while in the closed position shown in FIG. 3-2, the first hydraulic pathway 330 may still flow through the shaft bore 350 and the rotor bore 314. In the closed position, fluid may flow along a motor hydraulic pathway 333 and into the downhole motor 318 such that the fluid flow rotates the rotor 316. However, in some embodiments, in the closed position, the first hydraulic pathway 330 may be closed off such that no fluid flows through the shaft bore 350 or the rotor bore 314. A resilient member may urge the nozzle 324 downhole to the open position of FIG. 3-1. As the drilling fluid pressure increases, the drilling fluid pressure may exert a fluid pressure force on the nozzle 324 that urges the nozzle uphole to the closed position of FIG. 3-2.

Figures 1, 4:
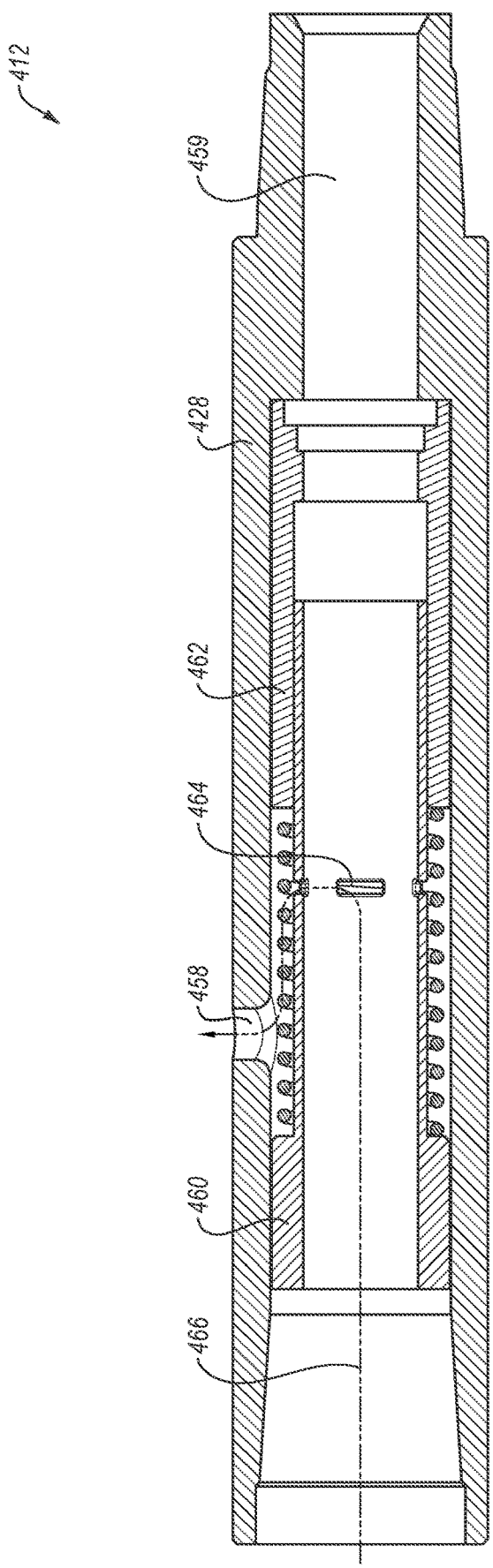
Figures 2, 4:
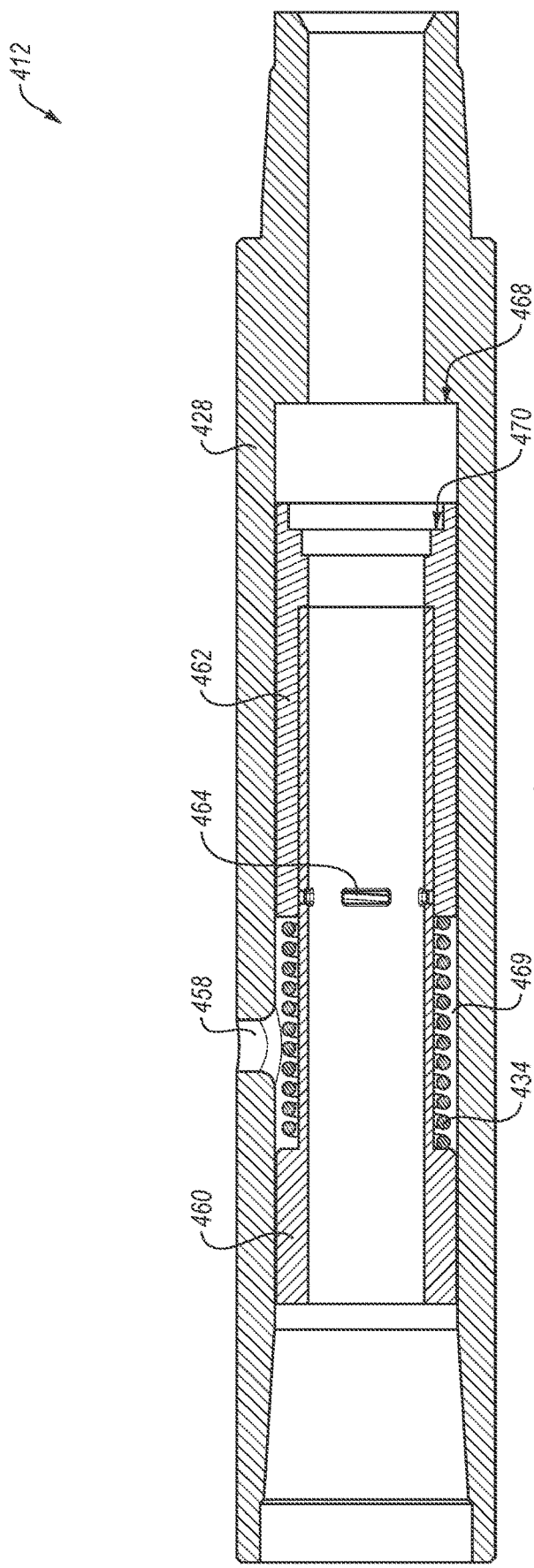

FIG. 4-1 is a representation of a motor bypass valve 412, according to at least one embodiment of the present disclosure. The motor bypass valve 412 may exhaust at least a portion of a drilling fluid to a borehole annulus between a housing 428 and a borehole wall. In this manner, the portion of the drilling fluid may bypass a downhole motor by leaving the housing 428 and returning to the surface. In the open position shown in FIG. 4-1, a housing port 458 in the housing 428 may be uncovered (e.g., open), and in the closed position shown in FIG. 4-2, the housing port 458 may be covered (e.g., closed). The housing port 458 may extend from an interior 459 of the housing 428 to an exterior of the housing 428.

The motor bypass valve 412 includes a stationary sleeve 460 connected to the housing 428. The stationary sleeve 460 is fixed to the housing 428. In some embodiments, the stationary sleeve 460 may be threaded into the housing 428, welded to the housing 428, brazed to the housing 428, bolted to the housing 428, screwed to the housing 428, or combinations thereof. A moving sleeve 462 is longitudinally movable relative to the stationary sleeve 460 between the stationary sleeve 460 and the housing 428.

The stationary sleeve 460 includes a sleeve port 464 that extends from an interior of the stationary sleeve 460 to an exterior of the stationary sleeve 460. In the open position shown, the housing port 458 may be in fluid communication with the sleeve port 464. In other words, a hydraulic pathway 466 may be open between the sleeve port 464 and the housing port 458. Thus, in the open position, drilling fluid may be diverted away from the downhole motor. In this manner, the amount of fluid that flows to the downhole motor may be reduced. This may cause the downhole motor not to rotate, or to rotate with less force. This may reduce the shock and vibration on the BHA caused by the downhole motor, thereby reducing damage to the BHA and the associated costs.

FIG. 4-2 is a representation of the motor bypass valve 412 of FIG. 4-1 in the closed position. In the closed position shown, the moving sleeve 462 may cover at least a portion of the sleeve port 464 on the stationary sleeve 460. In this manner, the hydraulic pathway (e.g., hydraulic pathway 466 of FIG. 4-1) from the sleeve port 464 to the housing port 458 may be at least partially blocked. This may reduce the amount of fluid that is exhausted to the borehole annulus, thereby increasing the amount of fluid that flows through the interior of the stationary sleeve 460, the moving sleeve 462, and the housing 428 and from there to the downhole motor.

The housing includes a housing shoulder 468. In the open position of FIG. 4-1, the moving sleeve 462 may be pushed against (e.g., contact, abut) the housing shoulder 468. In the open position, the sleeve port 464 and the housing port 458 may be uncovered by the moving sleeve 462. A resilient member 434 may urge the moving sleeve 462 to the open position. In some embodiments, the resilient member 434 may urge the moving sleeve 462 until it contacts the housing shoulder 468. In some embodiments, the resilient member 434 may be located in a sleeve annulus 469 between the stationary sleeve 460 and the housing 428.

The moving sleeve 462 may include a sleeve shoulder 470. In some embodiments, the drilling fluid pressure may exert a fluid pressure force on the sleeve shoulder 470. This may urge the sleeve shoulder 470 away from the housing shoulder 468 and toward the sleeve port 464. When the drilling fluid pressure overcomes the resilient member pressure, the moving sleeve 462 may move toward the closed position. In this manner, the moving sleeve 462 may be movable between the open and the closed position via a change in drilling fluid pressure. In some embodiments, in the closed position, the moving sleeve 462 may block or cover the sleeve port 464. In some embodiments, in the closed position, the moving sleeve 460 may block or cover the housing port 458. In some embodiments, in the closed position, the moving sleeve 462 may block or cover both the housing port 458 and the sleeve port 464. While the moving sleeve 462 is shown as moving longitudinally, the moving sleeve 462 may move in any other way relative to the stationary sleeve 460. For example, the moving sleeve 462 may rotate relative to the stationary sleeve 460 in response to a change in flow volume and/or drilling fluid pressure, thereby aligning the sleeve port 464 with the housing port 458.

Figures 1, 5:
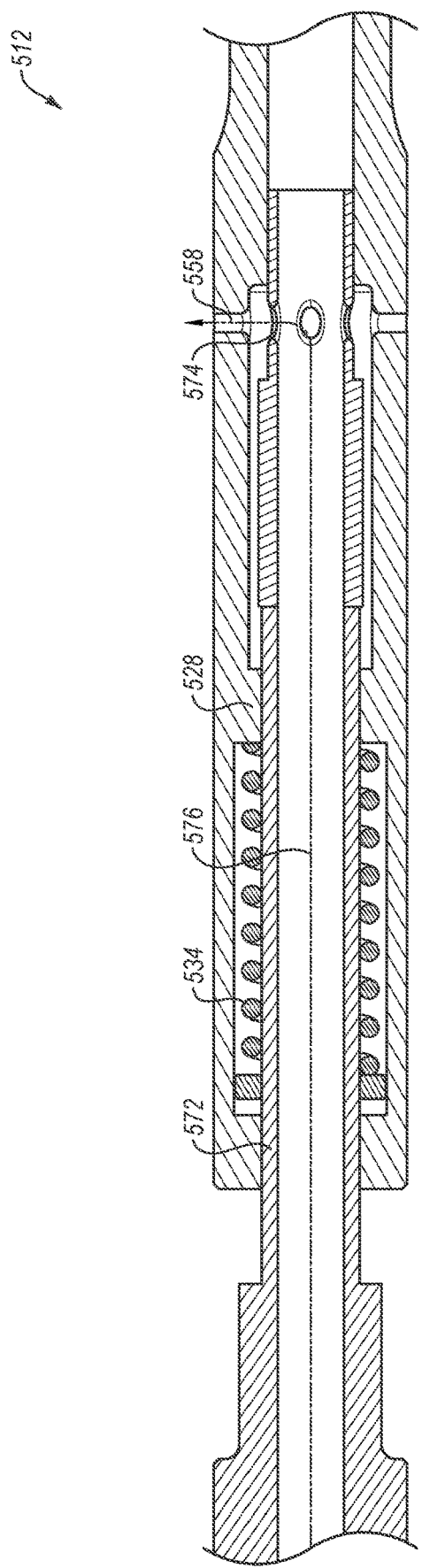
Figures 2, 5:
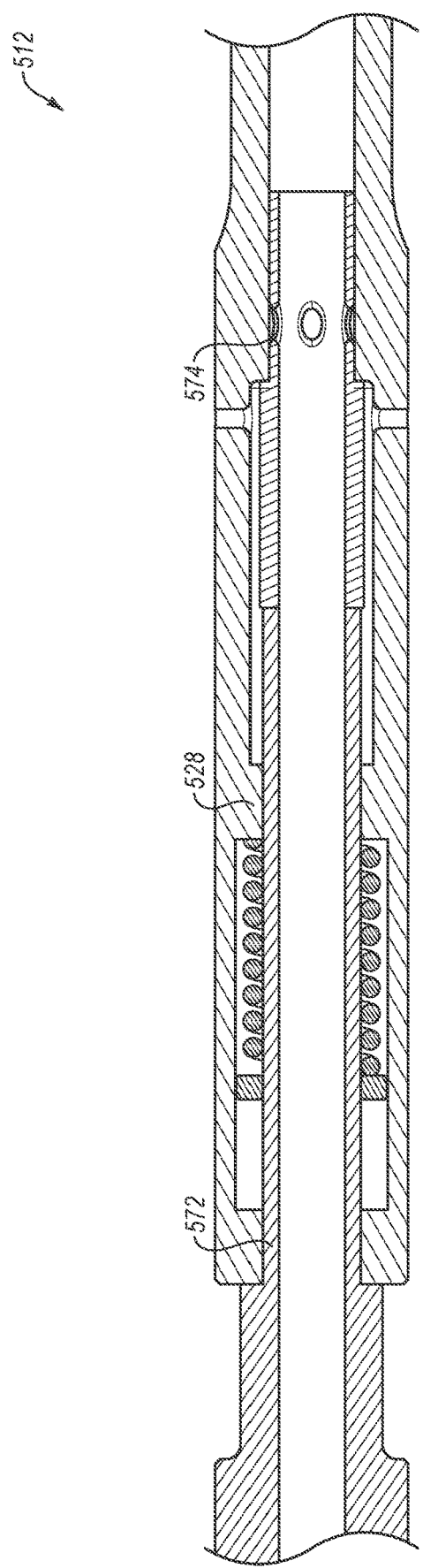

FIG. 5-1 is a representation of a motor bypass valve 512 in an open position, according to at least one embodiment of the present disclosure. The motor bypass valve 512 may be opened and closed based on the weight applied to the bit (weight on bit or WOB). An inner sleeve 572 is located in the interior of a housing 528. In some embodiments, the housing 528 may be longitudinally movable relative to the inner sleeve 572. The housing 528 may be connected to a bit downhole of the inner sleeve 572. As the WOB is increased (e.g., as weight is applied to the bit), the housing 528 may move longitudinally uphole. The housing 528 may slide along the inner sleeve 572 based on the extent of WOB applied. In some embodiments, a resilient member 534 may urge the housing 528 downhole with a resilient member force. When an uphole force (based on the WOB) on the housing 528 exceeds the resilient member force, the housing 528 may move uphole.

The housing 528 includes a housing port 558 that extends from an interior of the housing 528 to an exterior of the housing 528. The inner sleeve 572 may include a sleeve port 574 that extends from an interior of the inner sleeve 572 to an exterior of the inner sleeve 572. In the open position shown in FIG. 5-1, (e.g., with the bit off bottom and a low or zero WOB), the sleeve port 574 may be in hydraulic communication with the housing port 558. In other words, in the open position, the sleeve port 574 is uncovered and a hydraulic pathway 576 is open between the sleeve port 574 and the housing port 558. Thus, in the open position, at least a portion of the drilling fluid may be diverted out of the sleeve port 574 and out of the housing port 558. This may reduce the flow to the downhole motor such that the downhole motor may not rotate or may rotate with less force.

FIG. 5-2 is a representation of the motor bypass valve 512 of FIG. 5-1 in the closed position. In the closed position shown, the housing 528 may slide longitudinally relative to the inner sleeve 572, and the housing 528 may cover at least a portion of the sleeve port 574. Thus, in the closed position, an entirety, or a majority of the drilling fluid may flow through the inner sleeve 572 and into the housing 528. In some embodiments, in the closed position, the housing 528 may seal the sleeve port 574 such that no drilling fluid may exhaust through the sleeve port 574. In some embodiments, in the closed position, the housing 528 may partially cover the sleeve port 574 such that a reduced portion (relative to the open position) of drilling fluid is exhausted through the sleeve port 574. While the housing 528 is shown as moving longitudinally relative to the inner sleeve 572, the housing 528 may move in any other way relative to the inner sleeve 572. For example, the housing 528 may be connected to the inner sleeve 572 with a set of splines. As the WOB is increased, the splines may rotate the housing 528 relative to the inner sleeve 572 such that the housing port 558 aligns with the sleeve port 574.

This application generally relates to devices, systems, and method for diverting flow from a downhole motor when a bit is off bottom. In some embodiments, the motion of the downhole motor and/or the rotation of the drill string from the surface may cause shock and vibrations to the rest of the BHA. When the bit is at the bottom of the wellbore, the bit, and the rest of the BHA, may be stabilized. Therefore, the shock and vibrations caused by the motor may be reduced with the bit is on bottom. When the bit is off the bottom of the wellbore, the shock and vibration on the BHA may be increased. This may damage components of the BHA, and, in some instances, even twist off one or more components of the BHA (e.g., cause the rotational connection between components of the BHA to become disconnected). Bypassing at least a portion of the drilling fluid from the downhole motor may stop or reduce rotation of the downhole motor. Bypassing at least a portion of the drilling fluid from the downhole motor while the bit is off bottom may reduce the shock and vibration to the BHA caused by the downhole motor, which may reduce damage to the BHA, thereby decreasing costs associated with repairing equipment and lost drilling time.

In some embodiments, a motor bypass valve may be hydraulically activated. In some embodiments, when the bit is on bottom, the drilling fluid pressure of the drilling fluid is increased. This may be at least in part because of the proximity of nozzles on the bit to the bottom of the wellbore. When the bit is off bottom, the drilling fluid pressure may be decreased. Thus, by hydraulically activating the motor bypass valve, the motor bypass valve may be opened or closed based on the position of the bit (e.g., on bottom or off bottom). For example, the motor bypass valve may be open, such that drilling fluid bypasses the motor, when the bit is off bottom. The motor bypass valve may be closed, such that drilling fluid passes through the motor, when the bit is on bottom. Thus, the motor may be configured to operate when the bit is on bottom, and may not operate, or may operate at a reduced capacity, when the bit is off bottom.

In some embodiments, a motor bypass valve may direct drilling fluid through a rotor bore in the rotor of the downhole motor. For example, the rotor may include a rotor bore. The rotor bore has an inlet at an uphole end of the rotor and an outlet at a downhole end of the rotor. In some embodiments, a nozzle may be located at the inlet. The nozzle may be longitudinally movable relative to the rotor. The nozzle may include a nozzle bore. In some embodiments, the nozzle bore and the rotor bore may be coaxial. For example, both the nozzle bore and the rotor bore may have a longitudinal axis that is coaxial with a longitudinal axis of a housing. In some embodiments, the inlet of the rotor bore may be located above the stator of the downhole motor. The outlet of the rotor bore may be located below the stator of the downhole motor. Thus, fluid that passes through the rotor bore may bypass the downhole motor. Fluid that bypasses the downhole motor may not impart any energy to rotating the downhole motor.

In some embodiments, the nozzle may move between a first (e.g., closed) position and a second (e.g., open) position. In the closed position, a first hydraulic pathway may be open between the nozzle bore and the rotor bore. The first hydraulic pathway may be from the nozzle bore to the rotor bore. In some embodiments, the first hydraulic pathway may be the only hydraulic pathway to the rotor bore. In other words, in the closed position, drilling fluid may only enter the inlet of the rotor bore through the nozzle bore. In some embodiments, the nozzle may be solid (e.g., not include a nozzle bore), and in the closed position, the nozzle may fully or partially block the inlet to the rotor bore. In some embodiments, drilling fluid may not enter or exit the nozzle bore or the rotor bore between the nozzle and the rotor.

In the closed position, fluid may flow around a nozzle annulus and into the downhole motor. For example, the nozzle may be located in the interior of the motor housing. A nozzle annulus exists between the outer surface of the nozzle and the interior surface of the motor housing. A motor hydraulic pathway may direct fluid through the nozzle annulus and into the downhole motor. This fluid may engage the rotor and cause it to rotate. Thus, the closed position may be an operating position for the downhole motor. In other words, the energy of the drilling fluid traveling through the downhole motor with the nozzle in the closed position may be sufficient to rotate the rotor.

In the open position, a second hydraulic pathway to the rotor bore may be open. In some embodiments, the second hydraulic pathway may be from the nozzle annulus to the inlet of the rotor bore. In other words, in the open position, drilling fluid from the nozzle annulus may travel between the downhole end of the nozzle and the uphole end of the rotor and enter the rotor bore at the inlet. In some embodiments, the diverted portion of the fluid may be diverted from the motor hydraulic pathway to the second hydraulic pathway. In some embodiments, the diverted portion of drilling fluid that moves through the second hydraulic pathway may reduce the remaining portion of fluid that flows past the nozzle to the downhole motor. In some embodiments, the remaining portion of fluid traveling through the motor hydraulic pathway may be reduced such that the remaining portion does not have sufficient energy to rotate the rotor or rotates the rotor with a reduced rotational rate. In this manner, in the open position, at least a portion of the drilling fluid may bypass the downhole motor. Reducing or stopping the rotational rate of the rotor (e.g., bypassing the downhole motor) may lower the shock and vibrations experienced by the BHA, which may help to prevent damage to the BHA.

In some embodiments, the first hydraulic pathway may be open in the closed position and in the open position. In some embodiments, the second hydraulic pathway may be closed in the closed position. In this manner, the motor bypass valve is closed in the closed position, and the motor bypass valve is open in the open position. In some embodiments, the motor bypass valve may not have a first hydraulic pathway. In other words, the nozzle may be solid, and may not include a nozzle bore. In some embodiments, in the open position, the solid nozzle may seal the inlet of the rotor bore, and no fluid may enter the rotor bore. In some embodiments, when the nozzle is in the closed position, the nozzle may seal the second hydraulic pathway. Thus, in the closed position, no drilling fluid may pass into the rotor bore.

In some embodiments, the nozzle may be movable by one or more resilient members. For example, a resilient member may urge the nozzle toward the open position with a resilient member force. The drilling fluid pressure may exert a fluid pressure force on the nozzle toward the closed position. As the drilling fluid pressure increases, then the fluid pressure force may increase. When the fluid pressure force is greater than the resilient member force, then the nozzle may move toward the closed position. In some embodiments, the fluid pressure force may cause the nozzle to move from the open position to the closed position. In other words, the nozzle may move between the open position and the closed position based on the drilling fluid pressure. When the drilling fluid pressure reaches a valve actuating pressure, the nozzle may be moved to the closed position.

As discussed above, in some embodiments, the drilling fluid pressure may be higher when the bit is on bottom compared to when the bit is off bottom. Because the nozzle is urged toward the open position when the drilling pressure is relatively low (e.g., below the valve actuating pressure), the nozzle may be in the open position when the drilling pressure is relatively low. The nozzle may then be moved to the closed position when the drilling fluid pressure is increased (e.g., to above the valve actuating pressure). Thus, because the drilling fluid pressure is increased when the bit is on bottom, when the bit is on bottom, the nozzle may move into the closed position. Similarly, when the bit is moved off bottom, the drilling fluid pressure is decreased, and the nozzle may move into the open position. In some embodiments, the size of the resilient member may be selected based on the planned drilling fluid pressure. In other words, the resilient member may be sized based on operating drilling fluid pressure to be used during drilling. At any pressure less than the operating drilling fluid pressure, the resilient member force may be greater than the fluid pressure force, and the resilient member may urge the nozzle into the open position.

In this manner, the motor bypass valve may move between the open position (e.g., wherein drilling fluid may bypass the motor through the rotor bore) and the closed position (e.g., wherein drilling fluid may pass into and operate the downhole motor) based on whether the bit is on bottom or off bottom. Thus, whenever the bit is taken off bottom, the motor bypass valve may open, and the shock and vibration due to motor operation may be reduced or eliminated. This may limit the damage to downhole tools due to shock and vibration while the bit is off bottom.

In some embodiments, the open position may be uphole of the closed position. The uphole end of the rotor may extend into a nozzle cradle. The nozzle may rest in the cradle. For example, the cradle may include cradle walls that extend uphole. The outer walls of the nozzle may rest inside the cradle walls. The nozzle may slide along the cradle as the nozzle moves between the open position and the closed position. In some embodiments, a cross-sectional shape of the nozzle may include one or more longitudinal recesses. The longitudinal recesses may form a gap between the cradle and the nozzle. In the open position, this gap may be a portion of the second hydraulic pathway. In some embodiments, in the closed position, a downhole end of the nozzle may contact, engage, or abut the uphole end of the rotor. This may form a seal between the nozzle and the rotor such that the longitudinal recesses are sealed against the uphole end of the rotor. In this manner, in the closed position, fluid may not enter the rotor bore. A resilient member may urge the nozzle uphole toward the open position. As the drilling fluid pressure exceeds the resilient member force, the nozzle may move downhole toward the closed position. While the nozzle is described as moving longitudinally, the nozzle may move in any other way relative to the rotor. For example, the nozzle may rotate in response to a change in flow volume and/or drilling fluid pressure.

In some embodiments, the open position may be downhole of the closed position. The motor bypass valve may include a flow diverter connected to the housing. A connecting shaft may extend between the flow diverter and the rotor. The connecting shaft may include a shaft bore. The shaft bore may be in hydraulic communication with the rotor bore. In some embodiments, a nozzle may include a sleeve that extends around the connecting shaft. The connecting shaft may include one or more shaft ports that extend from a nozzle annulus to the shaft bore. In the open position, the nozzle may be downhole of the shaft ports, and the shaft ports may open a hydraulic pathway (e.g., the second hydraulic pathway) between the nozzle annulus and the shaft bore. In the closed position, the nozzle may at least partially cover the shaft ports. This may reduce or completely stop the flow of drilling fluid from the nozzle annulus to the shaft bore. A resilient member may urge the nozzle downhole to the open position. As the drilling fluid pressure increases, the drilling fluid pressure may exert a fluid pressure force on the nozzle that urges the nozzle uphole to the closed position.

In some embodiments, the motor bypass valve may be hydraulically actuated. In other words, the motor bypass valve may change between the open and the closed positions based on a change in the drilling fluid pressure. In some embodiments, the motor bypass valve may be electromechanically actuated. For example, a motor may move the nozzle between the open and the closed positions. A sensor (such as a position sensor, a weight sensor, or a fluid sensor) may detect when the bit is on bottom (e.g., by directly measuring weight or by sensing a higher fluid pressure), and may close the valve when the bit is on bottom.

In some embodiments, the motor bypass valve may exhaust at least a portion of the drilling fluid to a borehole annulus between the housing and the borehole wall. In this manner, the portion of the drilling fluid may bypass the motor by leaving the housing and returning to the surface. In the open position, a housing port in the housing may be open, and in the closed position, the housing port may be closed. The housing port may extend from an interior of the housing to an exterior of the housing.

In some embodiments, the motor bypass valve may include a stationary sleeve connected to the housing. In some embodiments, the stationary sleeve may be fixed to the housing. For example, the stationary sleeve may be threaded into the housing, welded to the housing, brazed to the housing, bolted to the housing, screwed to the housing, or combinations thereof. A moving sleeve may be longitudinally movable relative to the stationary sleeve. In some embodiments, the moving sleeve may be located between the stationary sleeve and the housing.

In some embodiments, the stationary sleeve may include a sleeve port that extends from an interior of the stationary sleeve to an exterior of the stationary sleeve. The housing may include a housing port. In the open position, the housing port may be in fluid communication with the sleeve port. In other words, a hydraulic pathway may be open between the sleeve port and the housing port. Thus, in the open position, drilling fluid may be diverted away from the downhole motor. Thus, the amount of fluid that flows to the downhole motor may be reduced. This may cause the downhole motor not to rotate or to rotate with less force. This may reduce the shock and vibration on the BHA caused by the downhole motor, thereby reducing damage to the BHA and the associated costs.

In the closed position, the moving sleeve may cover at least a portion of the sleeve port. In this manner, the hydraulic pathway from the sleeve port to the housing port may be at least partially blocked. This may reduce the amount of fluid that is exhausted to the borehole annulus, thereby increasing the amount of fluid that flows through the interior of the stationary sleeve, the moving sleeve, and the housing and from there to the downhole motor.

In some embodiments, the housing may include a housing shoulder. In the open position, the moving sleeve may be pushed against (e.g., contact, abut) the housing shoulder. In the open position, the sleeve port and the housing port may be uncovered by the moving sleeve. A resilient member may urge the moving sleeve to the open position. In some embodiments, the resilient member may urge the moving sleeve until it contacts the housing shoulder. In some embodiments, the resilient member may be located in a sleeve annulus between the stationary sleeve and the housing. The moving sleeve may include a sleeve shoulder. In some embodiments, the drilling fluid pressure may exert a fluid pressure force on the sleeve shoulder. This may urge the sleeve shoulder away from the housing shoulder and toward the sleeve port. When the drilling fluid pressure overcomes the resilient member pressure, the moving sleeve may move toward the closed position. In this manner, the moving sleeve may be movable between the open and the closed position via a change in drilling fluid pressure. In some embodiments, in the closed position, the moving sleeve may block or cover the sleeve port. In some embodiments, in the closed position, the moving sleeve may block or cover the housing port. In some embodiments, in the closed position, the moving sleeve may block or cover both the housing port and the sleeve port. While the moving sleeve is described as moving longitudinally, the moving sleeve may move in any other way relative to the stationary sleeve. For example, the moving sleeve may rotate relative to the stationary sleeve in response to a change in flow volume and/or drilling fluid pressure, thereby aligning the sleeve port with the housing port.

In some embodiments, the sleeve port may be located directly across from the housing port. For example, the sleeve port may be rotationally and longitudinally aligned with the housing port. For example, as the drilling fluid exits the stationary sleeve, the drilling fluid may follow a straight-line path from the sleeve port to the housing port. In some embodiments, the sleeve port may exhaust into the sleeve annulus between the stationary sleeve and the housing, and the drilling fluid may then travel through the sleeve annulus to the housing port. In some embodiments, the moving sleeve may include a moving sleeve port, and in the open position, the moving sleeve port may align with the stationary sleeve port and the housing port.

In the embodiment discussed above, the sleeve port is movable based on changes in the drilling fluid pressure. In some embodiments, the sleeve port may be electromechanically movable. For example, a motor may cause the sleeve port to between the open position and the closed position. The motor may be actuated based on a sensor (such as a position, a weight sensor, or a fluid sensor) at or near the bit.

In some embodiments, the motor bypass valve may be opened or closed based on WOB. In some embodiments, an inner sleeve may be located in the interior of the housing. In some embodiments, the housing may be longitudinally movable relative to the inner sleeve. The housing may be connected to a bit downhole of the inner sleeve. As the WOB is increased (e.g., as weight is applied to the bit), the housing may move longitudinally uphole. The housing may slide along the inner sleeve based on the extent of WOB applied. In some embodiments, a resilient member may urge the housing downhole with a resilient member force. When an uphole force (based on the WOB) on the housing that exceeds the resilient member force, the housing may move uphole.

The housing may include a housing port that extends from an interior of the housing to an exterior of the housing. The inner sleeve may include a sleeve port that extends from an interior of the inner sleeve to an exterior of the inner sleeve. In the open position (e.g., with the bit off bottom and a low or zero WOB), the sleeve port may be in hydraulic communication with the housing port. In other words, in the open position, the sleeve port is uncovered and a hydraulic pathway is open between the sleeve port and the housing port. Thus, in the open position, at least a portion of the drilling fluid may be diverted out of the sleeve port and out of the housing port. This may reduce the flow to the downhole motor such that the downhole motor may not rotate or may rotate with less force.

In some embodiments, in the closed position, the housing may slide longitudinally relative to the inner sleeve, and the housing may cover at least a portion of the sleeve port. Thus, in the closed position, an entirety, or a majority of the drilling fluid may flow through the inner sleeve and into the housing. In some embodiments, in the closed position, the housing may seal the sleeve port such that no drilling fluid may exhaust through the sleeve port. In some embodiments, in the closed position, the housing may partially cover the sleeve port such that a reduced portion (relative to the open position) of drilling fluid is exhausted through the sleeve port. While the housing is described as moving longitudinally relative to the inner sleeve, the housing may move in any other way relative to the inner sleeve. For example, the housing may be connected to the inner sleeve with a set of splines. As the WOB is increased, the splines may rotate the housing relative to the inner sleeve such that the housing port aligns with the sleeve port.

The embodiments of the motor bypass valve have been primarily described with reference to wellbore drilling operations; the motor bypass valves described herein may be used in applications other than the drilling of a wellbore. In other embodiments, motor bypass valves according to the present disclosure may be used outside a wellbore or other downhole environment used for the exploration or production of natural resources. For instance, motor bypass valves of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. Changes that come within the meaning and range of equivalency of the claims are to be embraced within their scope.

What is claimed is:

1. A motor bypass valve, comprising:
   a rotor for a downhole motor, the rotor including an inlet end, an outlet end, and a rotor bore, the rotor bore including an inlet at the inlet end and an outlet at the outlet end;
   a nozzle movable relative to the rotor, the nozzle including a nozzle bore, the nozzle having a first position and a second position, wherein in the first position, a first hydraulic pathway is open between the nozzle bore and the rotor bore, and wherein in the second position a second hydraulic pathway is open between a nozzle annulus and the rotor bore; and
   a resilient member disposed between the inlet end of the rotor and a downhole portion of the nozzle, wherein the resilient member comprises a spring and is configured to urge the nozzle to the second position.

2. The motor bypass valve of claim 1, wherein the nozzle bore is open to at least a portion of the second hydraulic pathway in the second position.

3. The motor bypass valve of claim 1, wherein the inlet is located above a stator of the downhole motor and the outlet is located below the stator of the downhole motor.

4. The motor bypass valve of claim 1, wherein the nozzle moves between the first position and the second position based on a drilling fluid pressure.

5. The motor bypass valve of claim 1, wherein the nozzle contacts the rotor in the first position.

6. The motor bypass valve of claim 1, wherein the nozzle seals the second hydraulic pathway in the first position.

7. The motor bypass valve of claim 1, wherein the nozzle annulus is between the nozzle and a housing of the motor bypass valve, the nozzle annulus including a motor hydraulic pathway to the downhole motor.

8. The motor bypass valve of claim 1, wherein the nozzle bore is coaxial with the rotor bore of the rotor.

9. A motor bypass valve, comprising:
   a housing including a housing port extending from an interior of the housing to an exterior of the housing;
   a stationary sleeve in the interior of the housing, the stationary sleeve including a sleeve port extending from an interior of the stationary sleeve to an exterior of the stationary sleeve;
   a moving sleeve being movable between a first position and a second position, wherein in the first position the moving sleeve covers the sleeve port to close a hydraulic pathway between the sleeve port and the housing port, and wherein in the second position, the sleeve port is uncovered and the hydraulic pathway is open between the sleeve port and the housing port; and
   a resilient member that urges the moving sleeve to the second position wherein the resilient member is arranged in a sleeve annulus radially between the stationary sleeve and the housing, and the hydraulic pathway extends from the sleeve port to the housing port through the sleeve annulus.

10. The motor bypass valve of claim 9, wherein the moving sleeve is movable between the first position and the second position via a change in drilling fluid pressure.

11. The motor bypass valve of claim 9, wherein the stationary sleeve is connected to the housing.

12. The motor bypass valve of claim 9, wherein the housing includes a housing shoulder, and wherein the moving sleeve abuts the housing shoulder in the second position.

13. The motor bypass valve of claim 9, wherein the moving sleeve includes a sleeve shoulder, and a drilling fluid pressure applies a fluid pressure force on the sleeve shoulder that urges the moving sleeve from the second position to the first position.

14. The motor bypass valve of claim 9, wherein a downhole portion of the stationary sleeve is radially inside an uphole portion of the moving sleeve in the first position and the second position.

15. A motor bypass valve, comprising:
   a housing including a housing port from an interior of the housing to an exterior of the housing; and
   an inner sleeve including a sleeve port from an interior of the inner sleeve to an exterior of the inner sleeve, wherein the housing is movable between a first position and a second position, wherein in the first position the housing covers the sleeve port and wherein in the second position the sleeve port is uncovered and a hydraulic pathway is open to a sleeve annulus between the sleeve port and the housing port, wherein the inner sleeve is radially offset from the housing in the second position by the sleeve annulus.

16. The motor bypass valve of claim 15, wherein in the first position, the sleeve port is sealed by the interior of the housing.

17. The motor bypass valve of claim 15, comprising a resilient member urging the housing to the second position.

18. The motor bypass valve of claim 15, wherein the sleeve port is longitudinally and rotationally aligned with the housing port.

* * * * *